(12) United States Patent
Basey et al.

(10) Patent No.: US 7,033,029 B2
(45) Date of Patent: Apr. 25, 2006

(54) INTERFACE TUBE WITH STEPPED CONFIGURATION

(75) Inventors: Gary Dennis Basey, Santa Rosa, CA (US); Eric Immel, West Linn, OR (US); Andrew Austin, Sherwood, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/860,555

(22) Filed: Jun. 2, 2004

(65) Prior Publication Data

US 2004/0263804 A1 Dec. 30, 2004

Related U.S. Application Data

(60) Provisional application No. 60/475,304, filed on Jun. 2, 2003.

(51) Int. Cl.
*G03B 21/28* (2006.01)
*G02F 1/13357* (2006.01)

(52) U.S. Cl. .......................... 353/97; 353/20; 353/119; 362/558; 362/561

(58) Field of Classification Search ................. 353/28, 353/20, 85–87, 97–99, 102, 119, 122; 362/555, 362/558, 560, 580–582, 561

See application file for complete search history.

(56) References Cited

U.S. PATENT DOCUMENTS

| | | | | |
|---|---|---|---|---|
| 2,270,517 A * | 1/1942 | Drucker | .......................... | 353/20 |
| 4,739,396 A | 4/1988 | Hyatt | | |
| 5,709,463 A * | 1/1998 | Igram | .......................... | 362/268 |
| 6,398,368 B1 * | 6/2002 | Chen | .......................... | 353/98 |
| 6,609,816 B1 * | 8/2003 | Ansari et al. | ................ | 362/294 |
| 6,637,895 B1 | 10/2003 | Fujimori et al. | | |
| 6,814,442 B1 * | 11/2004 | Okuyama et al. | .............. | 353/20 |
| 6,840,633 B1 * | 1/2005 | Davis et al. | ................... | 353/98 |
| 2001/0035720 A1 * | 11/2001 | Guthrie et al. | ................. | 315/39 |
| 2002/0018295 A1 | 2/2002 | Okuyama et al. | | |
| 2002/0064046 A1 | 5/2002 | Davis et al. | | |
| 2004/0120153 A1 * | 6/2004 | Pate | .......................... | 362/296 |
| 2004/0207822 A1 * | 10/2004 | Lee et al. | ..................... | 353/98 |

* cited by examiner

*Primary Examiner*—W. B. Perkey
*Assistant Examiner*—Andrew Sever
(74) *Attorney, Agent, or Firm*—Alleman Hall McCoy Russell & Tuttle LLP

(57) ABSTRACT

An interface tube is provided for an image display device. In one embodiment, an interface tube having an inside surface and a center region where the at least a portion of the inside surface includes light-disbursing elements. The light-disbursing elements may be configured to direct a substantial portion of reflected light away from the center region to prevent center region from exceeding a specified temperature.

25 Claims, 2 Drawing Sheets

INTERFACE TUBE WITH STEPPED CONFIGURATION

CROSS-REFERENCE TO RELATED APPLICATIONS

The present application claims priority under 35 U.S.C. § 119 to U.S. Provisional Patent Application Ser. No. 60/475,304, which was filed on Jun. 2, 2003. The disclosure of that application is hereby incorporated by reference in its entirety for all purposes.

TECHNICAL FIELD

The embodiments of the present disclosure relate generally to image display devices, and more particularly, to interface tubes adapted to be positioned between a light source and an image-producing element in an image display device.

BRIEF DESCRIPTION OF THE DRAWINGS

Various aspects of the invention are illustrated by way of example and not by way of limitation in the figures of the accompanying drawings, in which the like references indicate similar elements and in which.

DETAILED DESCRIPTION

Figure 1:
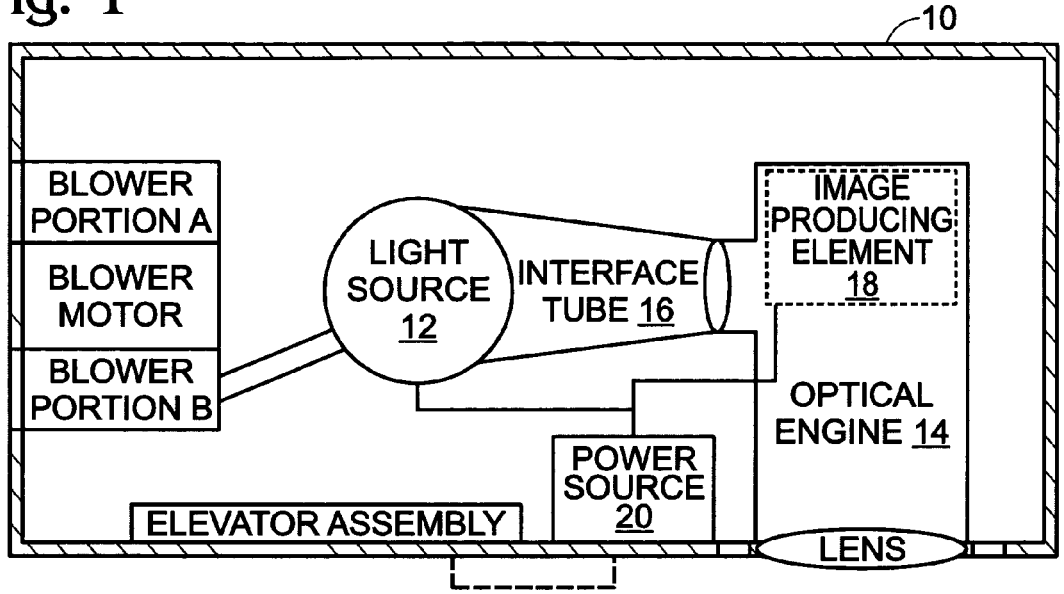
FIG. 1 is a schematic illustration of an exemplary projection device into which the present invention may be implemented according to an embodiment of the present invention.

A projection device 10 is illustrated schematically in FIG. 1. The projection device may be adapted to project an image on a display surface, including, but not limited to, a screen, a wall, or other viewing surface or area.

In some embodiments, the projection device may be a projector or image-generating device that is able to project an image onto a display surface. As used herein, a projection device or image-generating device may include any suitable display device or image projector, including, but not limited to, a digital projector, a liquid crystal display (LCD) projector, a digital light processing projector, a rear projection device, a front projection device, etc.

In its most basic form, the projection device 10 includes a light source (or lamp) 12 and an optical engine (or light engine) 14. The light source 12 may be adapted to produce a beam of light and project the light towards the optical engine 14, which may be configured to generate an image. In some embodiments, the light source 12 includes a lamp positioned within a reflector (e.g. interface tube) that is configured to direct most of the emitted light along an optical path of the system. The light source 12 may include any suitable type of lamp. Examples include, but are not limited to, metal halide lamps and ultra-high-pressure (UHP) arc lamps, etc. The system also may include one or more filters, such as an infrared (IR) or ultraviolet (UV) filter, to filter out unwanted parts of the emission spectra of the lamp, or otherwise filter the light produced from the lamp.

Light produced from the light source 12 may be channeled through an interface tube or spacer 16 to the optical engine 14. The optical engine 14 may include various optical components including filters, color wheels, lenses, mirrors, integrators, condensers, and other optical elements.

The optical engine 14 may include an image-producing element 18. The image-producing element 18 may include any suitable image-generation device, including, but not limited to, a digital micromirror (DMD), an LCD panel, or any other suitable image source. In an exemplary projection device, image-producing element 18 may be configured to project light toward one or more mirrors or other optics, which, in turn, may be configured to reflect light toward a display surface.

The projection device 10 typically includes one or more power sources 20. The power source 20 may be linked to the light source 12, the image-producing element 18, and other components, such as the power circuit board and control circuit board within the projection device.

Figure 2:
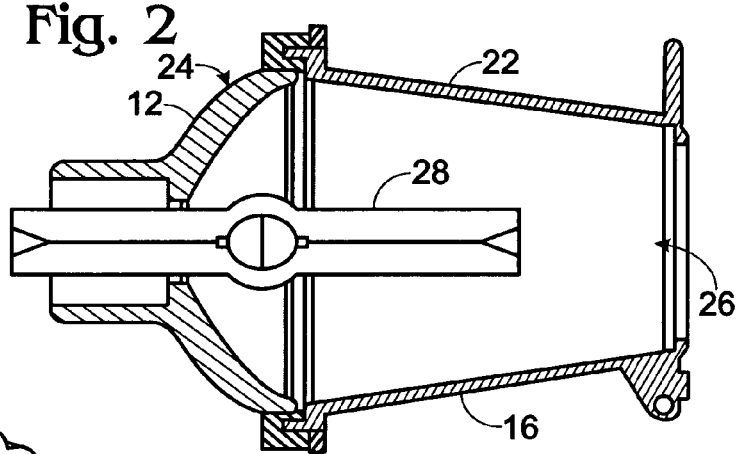
FIG. 2 is a somewhat schematic cross section of an exemplary interface tube that may be used in the projection device shown in FIG. 1.

As discussed above, a spacer or interface tube 16 may be interposed between the light source 12 and the optical engine 14 in order to channel light produced by the light source 12 to the optical engine 14. FIG. 2 is a somewhat schematic cross-sectional view depicting an exemplary relationship between a light source 12 and an interface tube 16. It should be appreciated that interface tube 18 may be any suitable shape to direct light from light source 12 to optical engine 14. For example, interface tube 18 may be cylindrical, bulbous, conical, etc. As shown in the exemplary embodiment of FIG. 2, interface tube 16 may have a frusta-conical, or straight-tapered, body. In some embodiments, a larger diameter end 24 may be configured to receive the light source 12. A smaller diameter end 26 may be directed towards the optical engine 14.

In some embodiments, light source 12 may include a forwardly projecting front arm 28. As shown, interface tube 16 may be adapted to receive some or all of the front arm 28 of the light source such that at least a portion of the front arm 28 extends into the body of the interface tube. Because the front arm 28 extends into a portion of the interface tube 16, reflection of light into the center of the interface tube may increase the concentration of light on the light source front arm 28. Such concentration of light may cause an increase in the temperature of the front arm. Increases in temperature, beyond the operating temperature of the light source front arm, may affect the performance of the light source. In some situations, the operating temperature of the front arm may be limited to a specified temperature range, beyond which operation of the light source may deteriorate.

Accordingly, the present disclosure provides an interface tube that includes a plurality of light-disbursing elements. The light-disbursing elements may be situated within the inner diameter of the interface tube body so as to reduce the amount of light reflected onto the front arm 28 of the light source 12. The light-disbursing elements may take the form of a plurality of distinct reflective surfaces adapted to reflect stray light at differing angles, e.g. 15 degrees, 30 degrees, 45 degrees, 60 degrees, 90 degrees, 120 degrees, etc., or any degree angle or combination of degree angles as desired. The distinct reflective surfaces may be a plurality of non-uniform distinct surfaces including, but not limited to, bumps, ridges, mounds, pits, steps, and the like.

In one embodiment, the light-disbursing elements may be a plurality of terraced steps. The steps may be angled at the same, or varying degrees, including, but not limited to, 30 degrees, 45 degrees, 60 degrees, 90 degrees, 120 degrees, etc. or any degree angle or combination of degree angles as desired.

The light-disbursing elements may be distributed evenly or unevenly throughout the entire internal surface of the interface tube. Alternatively, the light-disbursing elements may be located in only a portion of the internal surface of the interface tube. Different types of light-disbursing elements may be used in different portions of the interface tube. For example, a front portion or region may have a first type of light-disbursement element and a second portion or region of the interface tube may have a second type of light-disbursement element.

Figure 3:
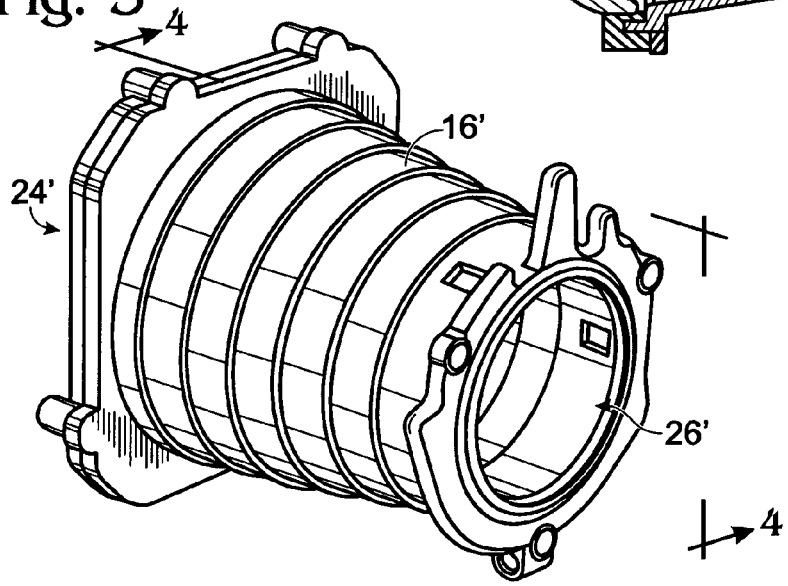
FIG. 3 is a perspective view of another exemplary interface tube that may be used in the projection device shown in FIG. 1.
Figure 4:
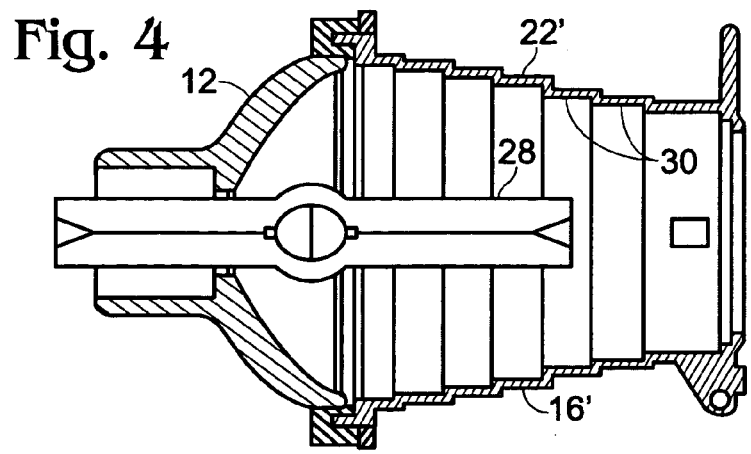
FIG. 4 is a cross-sectional view of the interface tube shown in FIG. 2 with the light source extending into the tube, in accordance with an embodiment of the present invention.

FIG. 3 is a perspective view of an exemplary interface tube 16', which has been configured to prevent overheating of the front arm due to reflected light. FIG. 4 is a cross-sectional view of interface tube 16'. As with interface tube 16 (FIG. 2), interface tube 16' may be used to channel light from the light source 12 to the optical engine 14 and may be adapted to receive some or all of the front arm 28 of the light source 12.

As shown in FIG. 4, interface tube 16' may include an inside surface configured to direct and reflect light. A portion of the inside surface may include light-disbursing elements configured to direct a substantial portion of reflected light away from the center region of the interface tube. By reducing the amount of light directed toward the center region of the interface tube, it may be possible to reduce the temperature of the center region.

FIGS. 3 and 4 further illustrate an exemplary interface tube having a stepped frusta-conical, or terraced, inside diameter. The larger diameter end 24' may be configured to receive the light source 12. The smaller diameter end 26' may be directed towards the optical engine.

Interface tube 16' may alternatively be described as having an inside surface that simulates a conical Ziggurat, or stepped pyramid, including a plurality of terraces or steps 30. The terraces may successively recede from the optical engine towards the light source 12 to form a generally tapered surface, which is broadest adjacent to the light source and narrowest adjacent to the optical engine. It will be appreciated that other configurations are also possible. For example, interface tube 16' could have a non-tapered cylindrical surface, a non-tapered surface, or a tapered surface having the broadest portion adjacent the optical engine and the narrowest portion adjacent the light source.

Figure 5:
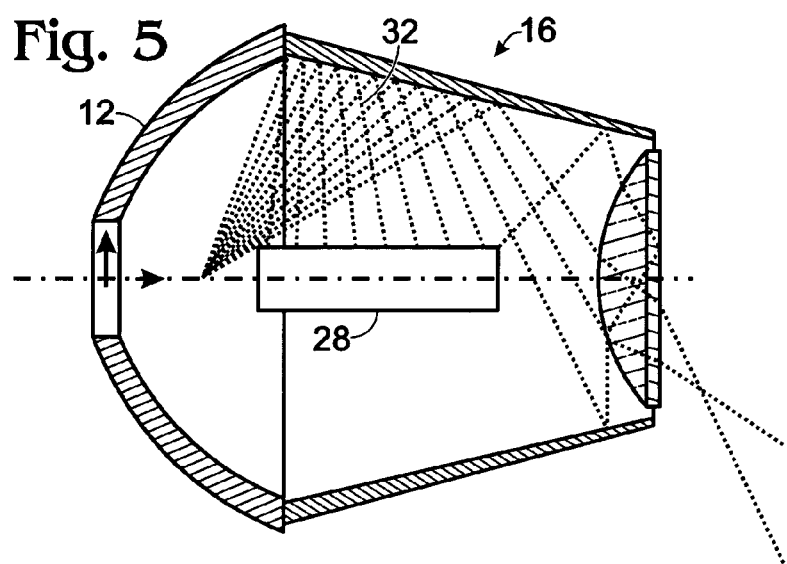
FIG. 5 is a schematic illustration of the reflection of light within a straight-tapered tube.
Figure 6:
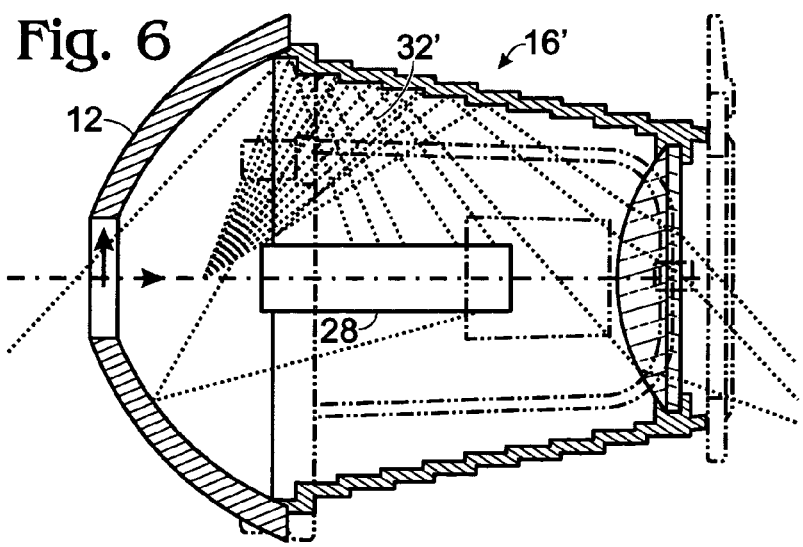
FIG. 6 is a schematic illustration of the reflection of light within an interface tube according to an embodiment of the present invention.

FIGS. 5 and 6 are schematic illustrations of the reflection of light within straight-tapered interface tubes and terraced interface tubes (i.e. FIGS. 3 and 4), respectively. As explained above, reflection of light into the center of the interface tube may increase the concentration of light on the light source front arm and such concentration of light may cause an increase in the temperature of the front arm. Increases in temperature, beyond the operating temperature of the light source front arm, may affect the performance of the light source.

When comparing the figures, it can be seen that a straight-tapered tube, the angle of the taper may result in stray light reflecting from the light source back into the center of the interface tube, while a terraced configuration (such as the configuration shown in FIG. 6) may disperse the reflected light throughout the tube, thereby limiting the amount of light reflected back into the center of the tube.

Thus, an interface tube that includes light-disbursing elements (such as the steps shown in FIGS. 4 and 6) may generate a refractive pattern of light that is substantially directed away from the portion of the front arm that is received in the interface tube when compared to the interface tube that does not include light-disbursing elements.

In some embodiments, each of the terraces or steps on the inside surface of the interface tube may be parallel or substantially parallel to the centerline of the interface tube. These substantially parallel terraces may be configured to generally reflect light at a relatively shallow angle, away from the center of the interface tube. Such reflection may limit the amount of light that is reflected back onto the light source front arm. The reduction of reflected light into the center of the interface tube may operate to reduce the temperature of a front arm relative to the temperature of a front arm in a straight-tapered tube.

Returning to FIGS. 3 and 4, it will be appreciated that the height, depth, and/or angle of each terrace or step 28 may be altered, as needed, to produce the desired reflection pattern. Moreover, the external and internal surfaces of the interface tube need not be the same, for example, the external surface of the interface tube may or may not display the steps or terraces included on the internal surface.

It will further be appreciated that interface tubes 16 and 16' may include fittings or other appropriate structure, as required, for securement to or with light source 12, optical engine 14, and/or projection device 10. For example, interface tube 16, as shown in FIG. 3 may include alignment features, such an alignment tooth or projection (shown at the top of smaller diameter end 26') which may be enable easy and accurate positioning of the interface tube relative the optical engine 14. Similarly, features may be provided to enable the interface tube to be locked or otherwise secured to light source 12 and/or optical engine 14. For example, the alignment features described above may further be configured to engage corresponding components on the optical engine and/or light source.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application.

What is claimed is:

1. An interface tube for an image display device configured to receive light comprising:
   an inside surface to direct and reflect light; and
   a center region as defined by the inside surface, where at least a portion of the inside surface includes light-disbursing elements configured to direct a substantial portion of reflected light away from the center region to prevent the center region from exceeding a specified temperature.

2. The interface tube of claim 1, wherein the light dispersing elements comprise a plurality of distinct reflective surfaces configured to reflect stray light at differing angles.

3. The interface tube of claim 1, where the inside surface is generally conical.

4. The interface tube of claim 1, where the inside surface includes a first end of a first diameter and a second end of a second diameter, where the first diameter is larger than the second diameter.

5. The interface tube of claim 4, wherein the inside surface is tapered.

6. The interface tube of claim 1, wherein the light dispersing elements comprising a series of stepped terraces.

7. The interface of claim 1, wherein the light-disbursing elements comprise one of a plurality of bumps, ridges, mounds, pits, and steps.

8. A projection device comprising:
a light source;
an optical engine configured to generate an image; and
a spacer disposed between the light source and optical engine such that light produced by the light source is directed by the spacer to the optical engine, the spacer comprising a plurality of light dispersing elements configured to substantially reflect light away from a central region of the spacer.

9. The projection device of claim 8, where the light dispersing elements comprise a plurality of distinct reflective surfaces configured to reflect stray light at differing angles.

10. The projection device of claim 9, where the spacer is generally conical in shape and the spacer generally decreases in width as it extends toward the optical engine.

11. The projection device of claim 10, where the plurality of distinct reflective surfaces is a series of stepped terraces.

12. A projection device including:
a light source including a front arm;
an optical engine; and
an interface tube disposed between the light source and the optical engine, the interface tube including a body having a non-uniform internal surface, the body being configured to receive at least a portion of the front arm, the interface tube having a plurality of light-disbursing elements adapted to generate a refractive pattern of light that is substantially directed away from the portion of the front arm that is received in the interface tube to prevent overheating of the front arm.

13. The projection device of claim 12, wherein the refractive pattern produced by the non-uniform internal surface substantially reduces the amount of light directed towards the front arm compared to a refractive pattern produced by a uniform internal surface.

14. The projection device of claim 12, wherein the interface tube is tapered.

15. The projection device of claim 14, wherein the interface tube is positioned such that the diameter of the tube generally decreases in width as it extends towards the optical engine.

16. The projection device of claim 12, wherein the non-uniform internal surface comprises a plurality of stepped terraces.

17. The projection device of claim 12, wherein the interface tube includes a stepped frusta-conical body.

18. The projection device of claim 12, wherein at least a portion of the body is conical.

19. The projection device of claim 12, wherein at least a portion of the body is frusta-conical.

20. The projection device of claim 12, wherein the body comprises a plurality of cylindrical sections, wherein the cylindrical sections have varying diameters.

21. The projection device of claim 20, wherein the cylindrical sections are arranged so as to generally decrease in diameter.

22. A projection device comprising:
a body enclosing:
a light source;
an optical engine configured to generate an image; and
a spacer being configured to direct light emitted by a light source towards an optical engine, the spacer being configured to receive at least a portion of the light source, the spacer comprising a series of stepped cylindrical elements in axial alignment, each cylindrical element having a decreased internal diameter relative to the next so as to create a plurality of terraced inner surfaces, the stepped cylindrical elements include surfaces configured to substantially reflect light away from the light source.

23. The projection device of claim 22, wherein the light source includes a front arm configured to extend partially into the spacer, and wherein the cylindrical elements are configured to reflect light substantially away from the front arm.

24. The projection device of claim 22, wherein each cylindrical element includes a reflective surface configured to reflect light at differing angles.

25. The projection device of claim 24, wherein the reflective surface is a non-uniform surface.

* * * * *